United States Patent [19]

Prescher et al.

[11] Patent Number: 6,143,816
[45] Date of Patent: Nov. 7, 2000

[54] FIRE RETARDANT PLASTIC MIXTURE AND METHOD OF PRODUCING A FILLER MATERIAL

[75] Inventors: Klaus-Dieter Prescher, Schwandorf; Johann Trettenbach, Maxhütte-Haidhof; Josef Fischer, Wackersdorf; Stefan Ross, Regensburg; Josef Brandl, Teublitz, all of Germany

[73] Assignee: Nabaltec-Nabwerk Aluminiumhydroxid Technologie GmbH, Schwandorf, Germany

[21] Appl. No.: 09/273,123

[22] Filed: Mar. 19, 1999

[30] Foreign Application Priority Data

Mar. 20, 1998 [DE] Germany ............... 198 12 279

[51] Int. Cl.⁷ ...................................... C08K 3/34
[52] U.S. Cl. .................. 524/444; 423/625; 423/626; 423/627; 423/628
[58] Field of Search ................... 423/625, 626, 423/627, 628; 524/444

[56] References Cited

U.S. PATENT DOCUMENTS

| 5,019,367 | 5/1991 | Oguri et al. ............... 423/626 |
| 5,306,680 | 4/1994 | Fukuda ................... 501/153 |
| 5,401,703 | 3/1995 | Fukuda ................... 501/153 |

FOREIGN PATENT DOCUMENTS

| 30 34 310 | 3/1989 | Germany . |
| 49-016738 | 2/1974 | Japan . |
| 51-027989 | 3/1976 | Japan . |
| 63-195114 | 8/1988 | Japan . |

OTHER PUBLICATIONS

*The Application of Hydrated Minerals Fillers as Fire Retardant and Smoke Suppressing Additives for Polymers* (P.R. Hornsby, Macromol. Symp. 108 (1996) pp. 203–219.
*Brandverhalten von Kunstsoffen* [*Fire Behavior of Plastic*], Jürgen Troitzsch, Carl Hanser Verlag München, 1981, pp. 11,18/19, 23).

*Primary Examiner*—Kriellion Sanders
*Attorney, Agent, or Firm*—Collard & Roe, P.C.

[57] ABSTRACT

A fire-retardant plastic mixture contains 55%–75% by weight of boehmite which has an orthorhombic crystal structure and has the general formula $AlO_x(OH)_{3-2x}$ with x-values ranging between 0.8 and 0.99, and has a mean grain diameter $d_{50}$ ranging between 0.4 and 0.7 μm, a $d_{10}$ value ranging between 0.7 and 1.2 μm and a $d_{90}$ value ranging between 0.2 and 0.4 μm. The filler material is used in the form of a finely-crystallized hydrargillite which is obtained during a precipitation process according to Bayer with a grain diameter of 0.5 to 3 μm, which is suspended and which, without any mechanical working, is transformed directly in a hydro-thermal process at temperatures ranging between 220° C. and 240° C. under turbulent conditions into a boehmite of the general formula $AlO_x(OH)_{3-2x}$ with x-values ranging between 0.8 and 0.99. The phase transformation pressure amounts to at least 24 bar after a holding time of 1–15 minutes at the maximum temperature and then the pressure is reduced to ambient pressure.

7 Claims, 3 Drawing Sheets

FIRE RETARDANT PLASTIC MIXTURE AND METHOD OF PRODUCING A FILLER MATERIAL

BACKGROUND OF THE INVENTION

1. Field of the Invention

The present invention relates to a composition comprising a fire-retardant plastic mixture which contains 55%–75% by weight of boehmite, and to a method of producing a filler material for being worked into the plastic mixture.

2. The Prior Art

DE 33 08 023 CS discloses subjecting hydrargillite to a thermal treatment at 180° C.–200° C. In the process, the hydrargillite changes into boehmite and, in the form of a fire-retardant agent and for pigmentation purposes, it can be worked into plastics in percentages up to 80%.

Furthermore, DE 30 04 310 CS discloses transforming hydrargillite into boehmite at 200° C.–270° C. over a period of 1 to 60 minutes, and then to cool the suspension by reducing the pressure to atmospheric pressure. In the process, the hydrargillite boehmitizes on the surface, so that the main percentage of aluminum hydroxide still contains a bonded percentage of water which is clearly greater than 30%. Furthermore, Table 1 shows that approximately 70% of the boehmitized hydrargillite obtained has a particle size smaller than 60 $\mu$m. This material can be used to produce a rubber filler material for small mechanical loads.

Other fire-retardant plastic mixtures are used, for example in cables, in cable sheaths, and in cable insulation. The requirements to be met by such mixtures with respect to physical properties (mechanical and electrical properties) are extremely high. Only very fine-grained mineral flame-retardant agents (mean grain diameter smaller than 2 $\mu$m) are able to meet such high requirements at present. In addition to the fineness of the grain size, the grain shape of the filler material also plays a decisive part. This is to ensure that in view of the high degree of filling, the viscosity level is kept moderately high during processing. High-quality commercial magnesium hydroxides which best meet the high requirements in force are relatively expensive. This is because they do not constitute mass products; and the production processes involved are complicated and expensive.

In the case of fire, the conductor sheaths, if consisting of the above material, have to meet stringent requirements. The fire-retardant plastic mixture, due to its high thermal stability, has to act as a mechanical spacer between the conductor wires. Even in the decomposed condition, it largely has to guarantee the insulating effect. This can only be achieved if the decomposition products occurring at the respective temperature of the fire form a relatively firm, stable protective layer.

From the literature reference (e.g. P. R. Hornsby, *Macromol. Symp.* 108 (1996) 203–219), it is known that one of the preconditions for being able to use a mineral filler material as a fire-retardant agent in a certain plastic system is based upon the relative decomposition temperatures of the polymer and the filler material. This becomes clear if one looks more closely at the various phases of a fire (see also *Brandverhalten von Kunststoffen* [*Fire Behavior of Plastics*]; author Juergen Troitzsch, publisher Carl Hanser Verlag, Munich, 1981, p. 11). A flame retarding agent has to play its part before the actual fire which is no longer controllable breaks out. This refers to the time between the start of the fire and the fully developed fire (characterized by the so-called flash-over). In such cases, flame retarding agents, because of their self-extinguishing properties, can either prevent a fire altogether or delay the outbreak of the fire sufficiently to allow plenty of time to minimize injury to people and damage to buildings. If the decomposition temperature of the filler material is clearly higher than the ignition temperature of the polymer, the contribution made by the filler to fire protection is not very high.

SUMMARY OF THE INVENTION

It is an object of the present invention to provide a filler material especially for cable sheaths and cable insulation, which filler material is suitable for being mixed with plastics, such as polypropylene (PP), polyamide (PA), or the like, and which has a decomposition temperature in excess of 300° C. and to provide a method which is suitable for producing such a filler material, which is cost-effective and achieves uniformly good properties.

The above object has been achieved by the present invention wherein a composition comprising a fire-retardant plastic mixture containing 55%–75% by weight of boehmite, based upon the total composition weight, said boehmite comprising an orthorhombic crystal structure and having a general formula $AlO_x(OH)_{3-2x}$ with x-values ranging between 0.8 and 0.99 and having a mean grain diameter $d_{50}$ ranging between 0.4 and 0.7 $\mu$m with a $d_{10}$ value ranging between 0.7 and 1.2 $\mu$m and with a $d_{90}$ value ranging between 0.2 and 0.4 $\mu$m.

It has now been found that the filler material produced has a very narrow grain size distribution and has a very good fire prevention and mixing behavior. The surface properties of the boehmite are advantageously influenced by its orthorhombic crystal structure and the low $Na_2O$ content of less than 0.05% by weight based upon the boehmite weight. For applications in the color spectrum of "white to lightly colored", a degree of whiteness of >95% is advantageous which, in accordance with the invention, can also be observed in cases of mass production.

Simple fire tests showed that cable mixtures produced by using the filler material of the present invention have a good insulating barrier layer even after the decomposition temperature has been reached. There remained a mineralized protective layer which had a high ash strength. In this way, it is possible to avoid electrical short-circuiting of the metal wiring during cable fires.

The powdery boehmite produced in accordance with the method of the invention has an ignition loss of about 17% by weight which, at temperatures in excess of 300° C., is still at least 15% by weight. The maximum decomposition speed and loss of about 17% are reached at about 500° C. This is clearly higher than the decomposition range and the ignition temperature of existing thermoplasts (see also *Brandverhalten von Kunststoffen* (*Fire Behavior of Plastics*) author: Juergen Troitzsch, publisher: Carl Hanser Verlag, Munich, 1981, pp. 19 and 23).

Surprisingly, in spite of its high decomposition temperature, the filler material produced in accordance with the invention has been used as a fire-retardant filler material, especially in the field of cable sheaths.

BRIEF DESCRIPTION OF THE DRAWINGS

Other objects and features of the present invention will become apparent from the following detailed description considered in connection with the accompanying drawings and examples which disclose several embodiments of the present invention. It should be understood, however, that the drawings and examples are designed for the purpose of illustration only and not as a definition of the limits of the invention.

In the drawings

DETAILED DESCRIPTION OF PREFERRED EMBODIMENTS

Figure 1:
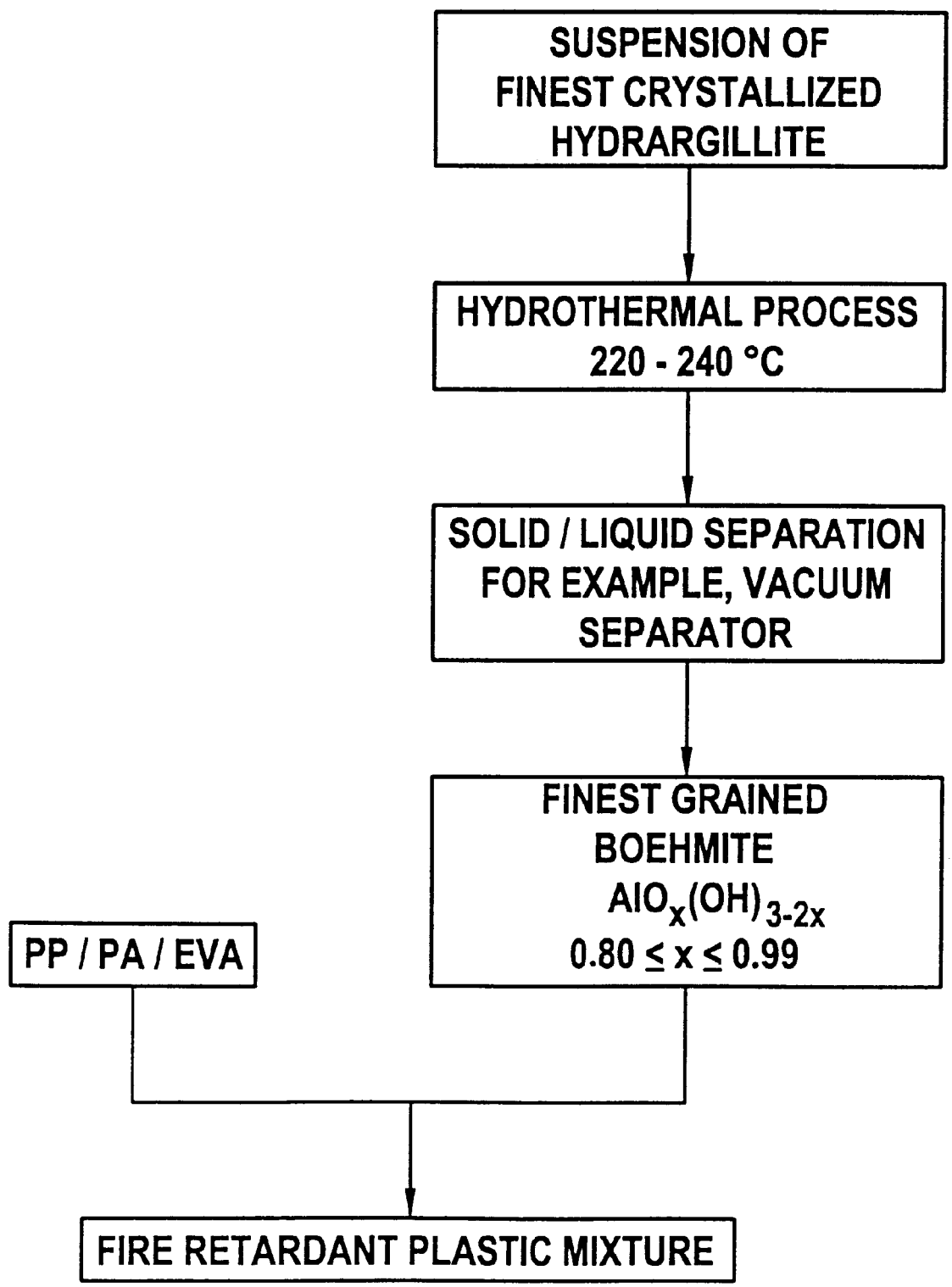
FIG. 1 illustrates the method of producing a filler material in accordance with the invention in the form of a block diagram.

Turning now in detail to the drawings, a fire-retardant plastic mixture is produced in accordance with the block diagram of FIG. 1. A suspension of finest-crystallized hydrargillite, within certain narrow parameter limits, is subjected to a hydro-thermal process wherein, after the solid-liquid separation, a finest-grained boehmite is produced. This boehmite in accordance with the invention is subsequently processed together with the respective plastics to produce a fire-retardant plastic mixture.

Boehmite is characterized by the following properties:

easy powder handling in spite of its great fineness (only slight tendency toward clumping together);

easily dispersible with a large number of types of plastics without the need for additional prior surface treatment;

balanced mechanical properties of the filled compound;

adequate chemical resistance to strong acids and to strong bases due to its inert chemical properties;

advantageous cost structure;

processing temperatures up to 280° C.; and high extrusion speeds possible.

Figure 2:
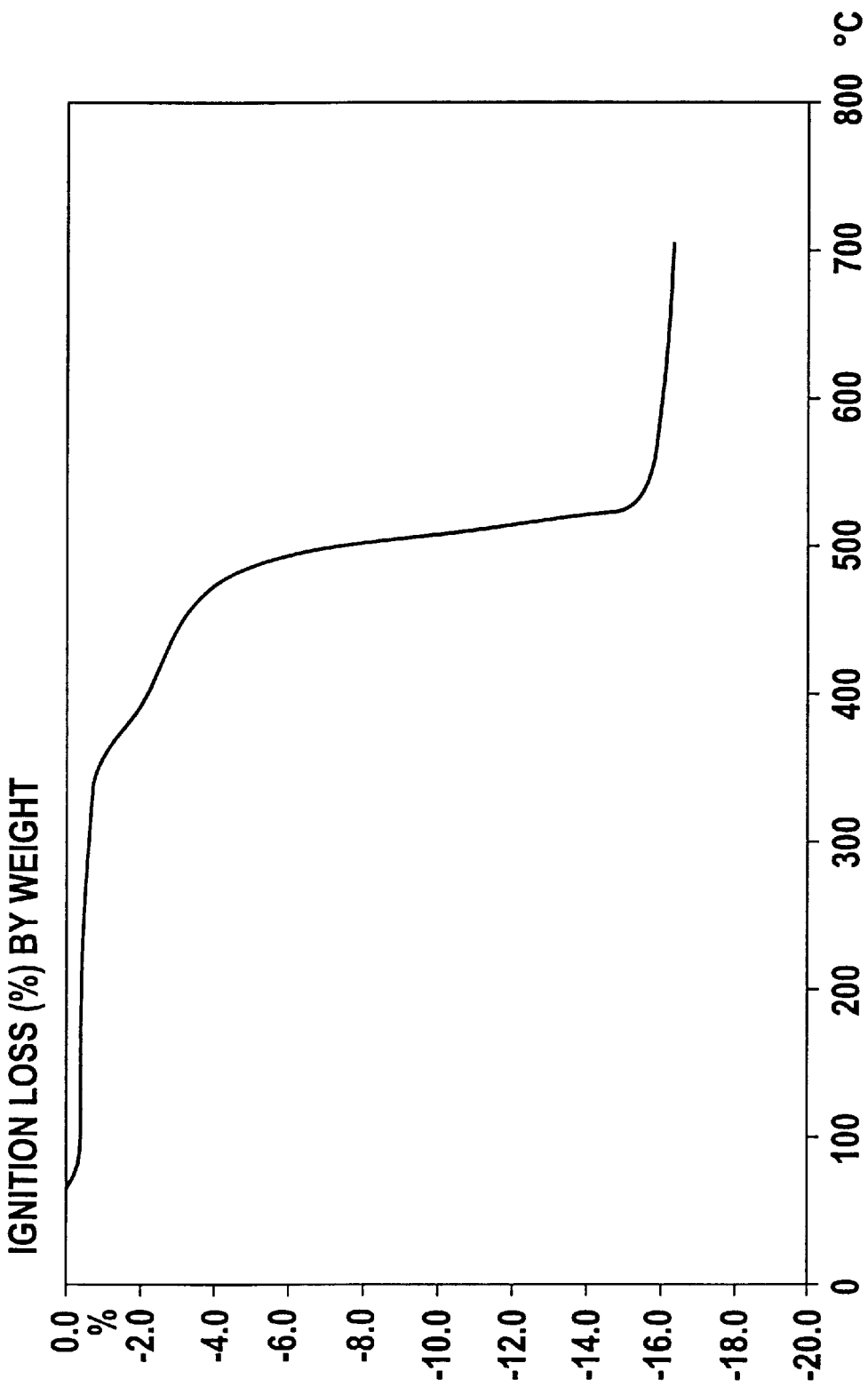
FIG. 2 shows the ignition loss of a boehmite specimen of the invention as a function of the temperature (heating rate 5° C./min)

FIG. 2 shows that up to 300° C., the ignition loss of the boehmite of the invention amounts to about 1.0% by weight. Thereafter, the ignition loss increases steadily, and at about 500° C., this loss reaches its maximum decomposition speed and value of about 17% by weight. In the case of fire, the decomposition process which initially is moderate and quite gentle permits the slow build-up of a mineral layer whose thickness and stability increases as the decomposition progresses. To avoid short-circuiting, this characteristic is very important, especially in the case of burning electrical cables.

Figure 3:
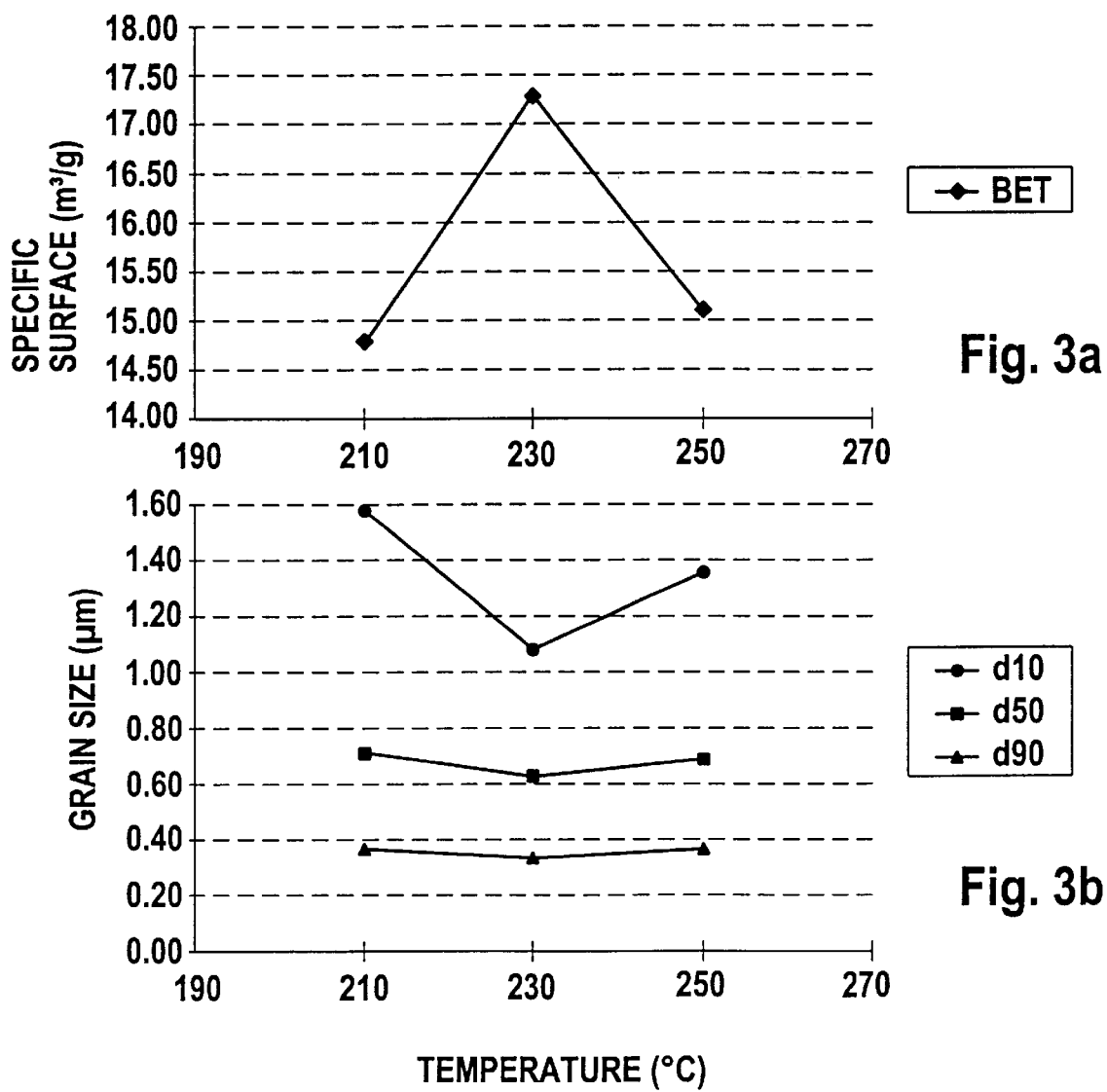
FIG. 3a shows the BET distribution (DIN 66131/66132) in the case of a boehmite sample in accordance with the method of the invention as a function of its production temperature (phase transformation of hydrargillite to boehmite)
FIG. 3b shows the grain parameters (Cilas laser granulometer HR 850) of a boehmite produced in accordance with the method of the invention, as a function of its production temperature (phase transformation of hydrargillite to boehmite).

FIG. 3a shows the BET distribution which occurs in the boehmite produced in accordance with the invention in the hydro-thermal process. Surprisingly, it has been found that in the temperature range of 220° C. to 240° C., the BET achieves a maximum value of between 17 and 17.5 m²/g.

As can be seen in FIG. 3b, the boehmite produced in accordance with the method of the invention is characterized by minimum grain size parameters, especially at a production temperature of 230° C. and a holding time of 1–15 minutes. This means that a boehmite produced in this way is extremely fine grained while at the same time comprising a very narrow grain size distribution.

The grain size distribution was determined by laser granulometry (CILAS HR 850). The characteristic grain sizes d given below for the boehmite produced in accordance with the invention correspond to the parameters R (residue) according to DIN 66141:

$d_{10}$-value: 0.7–1.2 μm $d_{50}$-value: 0.4–0.7 μm $d_{90}$-value: 0.2–0.4 μm As a result of such a narrow grain size distribution, the boehmite of the invention thus consists of particles of a relatively similar size, which facilitates the process of working the filler material into the polymer matrix. Also this permits the production of very homogeneous plastic compositions with fire retardant properties.

This boehmite thus meets the initially mentioned stringent requirements with respect to mixing-in, mechanical strength values and good processability. Furthermore, the product produced in accordance with the invention possesses good powder handling and, in the case of fire, meets the stringent requirements of the electrical cable industry.

In addition, the minimum grain parameters, i.e. the high degree of fineness, coincide with a maximum specific surface area. It is a well-known fact that the finer the filler material is, the more rapid is the decomposition of a mineral filler material required to achieve the fire-retardant properties. The boehmite of the invention produced at temperatures ranging between 220° C. and 240° C. is thus particularly suitable as a fire-retardant filler material.

In the initially mentioned journal "*Industrial Minerals*", it is described that most mineral filler materials have polar surfaces which are only slightly compatible with polymer materials. Furthermore, the surface of a commercial synthetic magnesium hydroxide, for example is clearly more alkaline (the pH value of an aqueous suspension is about 9) than that of boehmite (pH value about 7.5). This is because the production method permits the separation of most of the interfering foreign ions. The ions contained in commercial magnesium hydroxide, when being processed, can interact with other constituents of the formulation (e.g. stabilizers, cross-linking agents), thus adversely affecting the activity and efficiency of the $Mg(OH)_2$. This is the reason why, so far, the filler material surface has frequently been pre-treated, for example with fatty acids or organofunctional silanes. Such a pre-treatment, which is also expensive, is not necessary in the case of boehmite because of the almost neutral surface of this beohmite. This means that even in the untreated form, the boehmite of the invention is easy to work into polymer mixtures and can be dispersed homogeneously.

Suprisingly, it has been found that if the boehmite of the invention does have a polar surface, then it could be homogeneously worked, even without a prior surface treatment, into polymer mixtures in percentages up to 75% by weight. This percent by weight is based upon the total composition weight. Also, the mechanical values will remain at a relatively high level, as can be seen from the Examples of the invention mentioned below.

EXAMPLE 1

500 g of ESCORENE UL 00119® (Deutsche Exxon Chemical GmbH, Cologne) were processed in a closed mixer at a temperature of 175° C. together with 800 g of the boehmite of the invention in the presence of 5 g of amino silane for 20 minutes so as to form a homogenous mixture composition.

EXAMPLE 2 (COMPARISON)

500 g of ESCORENE UL 00119® (Deutsche Exxon Chemical GmbH, Cologne) were processed in a closed mixer at a temperature of 175° C. together with 800 g of a natural magnesium hydroxide (mean grain diameter 2.3 μm) in the presence of 5 g of amino silane for 20 minutes so as to form a homogeneous mixture composition.

EXAMPLE 3 (COMPARISON)

500 g of ESCORENE UL 00119® (Deutsche Exxon Chemical GmbH, Cologne) were processed in a closed mixer at a temperature of 175° C. together with 800 g of a synthetic magnesium hydroxide (mean grain diameter 0.75 μm) in the presence of 5 g of amino silane for 20 minutes so as to form a homogeneous mixture composition.

EXAMPLE 4

480 g of ESCORENE UL 00119® (Deutsche Exxon Chemical GmbH, Cologne) were processed in a closed mixer at a temperature of 175° C. together with 600 g of the boehmite of the invention in the presence of 3.75 g of amino silane for 20 minutes so as to form a homogeneous mixture composition.

EXAMPLE 5

350 g of ESCORENE UL 00119® (Deutsche Exxon Chemical GmbH, Cologne) were processed in a closed mixer at a temperature of 175° C. together with 800 g of the boehmite of the invention in the presence of 5 g of amino silane for 20 minutes so as to form a homogeneous mixture composition.

The above-described compositions were pressed for 12 minutes at 145° C. for the purpose of producing plates which were used for punching out test specimens.

| Property Tested | Test Conducted |
| --- | --- |
| tensile strength | DIN 53504 |
| tear resistance | DIN 53504 |
| melt index MFI (190° C.; 21.6 kg) | ASTM D 1238 |
| limiting oxygen index LOI | ASTM D 2863-77 |

TABLE 1

| Example No. | Degr. of filling % by weight | Tensile str. N/nm$^2$ | Tear res. (%) | melt index cm$^3$/10 min | LOI (% O$_2$) |
| --- | --- | --- | --- | --- | --- |
| 1 | 61.3 | 18.2 | 165 | 0.5 | 34.6 |
| 2 | 61.3 | 14.2 | 83 | 3.0 | 36.8 |
| 3 | 61.3 | 14.6 | 135 | 0.3 | 39.2 |
| 4 | 55.4 | 18.6 | 254 | 1.7 | 28.0 |
| 5 | 69.3 | 16.3 | 98 | 0.1 | 41.4 |

The above test results of Table 1 show that the mixture filled with the boehmite in accordance with the invention (Example No. 1) has clearly better mechanical properties than the mixtures filled with magnesium hydroxide (Comparison Examples No. 2 and 3). As regards the melt index which provides information regarding processability during the mixing process, mixture No. 2 filled with the natural magnesium hydroxide produced fairly good results. However, these are connected with relative low elongation values of the finished compound, which do not meet the usually stringent requirements for such mixtures.

Equally, the fire resistance of mixture 1, characterized by the LOI value is on a comparably high level. Even at very high degrees of filling up to 70% by weight (Example No. 5), the mixture filled with boehmite still provides better mechanical strength values combined with acceptable elongation values as compared to mixtures filled with only approximately 61% by weight of magnesium hydroxide. It should also be emphasized that a mixture containing 69% by weight of boehmite has a clearly higher LOI value.

Generally speaking, it can be said that determining the LOI value represents a simple and quick laboratory method of assessing the fire resistance of a plastic mixture. Transferring the results to actual fire tests, for example in the cable industry, is difficult because the test conditions and test criteria are completely different.

EXAMPLE 6

A commercial polypropylene-copolymer was processed together with the boehmite of the invention on a double screw extruder so as to form a homogeneous mixture composition with a filler material content of 60% by weight, based upon the total composition weight.

EXAMPLE 7 (COMPARISON)

A commercial polypropylene-copolymer was processed together with a synthetic magnesium hydroxide on a double screw extruder so as to form a homogeneous mixture composition with a filler material content of 60% by weight, based upon the total composition weight.

EXAMPLE 8

A commercial polypropylene-copolymer was processed together with a filler material mixture of the boehmite of the invention and a synthetic magnesium hydroxide (50:50 (w/w)) on a double screw extruder so as to form a homogeneous mixture composition with a filler material content of 60% by weight, based upon the total composition weight.

In Examples 6 to 8, the test specimens were punched out of a strip which was produced by a corresponding device at the extruder head.

TABLE 2

| Example No. | Degree of filling (% by weight) | Tensile str. (N/mm$^2$) | Tear res. (%) | LOI (% O$_2$) |
| --- | --- | --- | --- | --- |
| 6 | 60 | 19.1 | 141 | 27.8 |
| 7 | 60 | 16.5 | 130 | 32.5 |
| 8 | 60 | 17.9 | 139 | 30.9 |

A comparison of the two PP mixtures of Examples 6 and 7 indicates that the listed mechanical properties of the mixture composition filled with the boehmite in accordance with the invention exceeds the respective values of the Mg(OH)$_2$ compound. In addition to the balanced mechanical property profile, it is possible, if required, to raise the LOI value by adding magnesium hydroxide to the plastic mixture composition (see Example 8).

It is possible to prepare individual mixtures adapted to the customer's requirements, with the mechanical properties of the filled composition at the same time remaining at a high level.

Accordingly, while a few embodiments of the present invention have been shown and described, it is to be understood that many changes and modifications may be made thereunto without departing from the spirit and scope of the invention as defined in the appended claims.

What is claimed is:

1. A composition comprising a fire-retardant plastic mixture containing 55%–75% by weight of boehmite, based upon the total composition weight, said boehmite comprising an orthorhombic crystal structure and having a general formula $AlO_x(OH)_{3-2x}$ with x-values ranging between 0.8 and 0.99, and having a mean grain diameter $d_{50}$ ranging between 0.4 and 0.7 µm, with a $d_{10}$ value ranging between 0.7 and 1.2 µm and with a $d_{90}$ value ranging between 0.2 and 0.4 µm.

2. The composition according to claim 1, wherein the boehmite further comprises a total $Na_2O$ concentration of less than 0.05% by weight based upon the aluminum oxide content weight.

3. The composition according to claim 1, wherein the boehmite has a degree of whiteness greater than 95%.

4. A method of producing a solid boehmite filler material for being worked into a plastic to form a fire-retardant plastic mixture comprising providing a hydrargillite suspension starting material being a finely-crystallized hydrargillite and having a grain diameter of 0.5 to 3 µm;

without any mechanical working, transforming said suspension directly in a hydro-thermal process at temperatures ranging between 220° C. and 240° C. under turbulent conditions into a boehmite of a general formula $AlO_x(OH)_{3-2x}$ with x-values ranging between 0.8 and 0.99; and reducing a pressure of at least 24 bar required for phase transformation to boehmite to ambient pressure after a holding time of 1–15 minutes at a maximum temperature.

5. The method according to claim 4, wherein the holding time is 9–11 minutes.

6. A method according to claim 4, wherein following the hydro-thermal process, introducing the suspension into a liquid-solid separating stage.

7. A method according to claim 4, comprising drying a solid boehmite obtained.

* * * * *